Patented Feb. 22, 1938

2,108,928

UNITED STATES PATENT OFFICE 2,108,928

METHOD FOR THE POLYMERIZATION OF ROSIN

Alfred L. Rummelsburg, Wilmington, Del., assignor to Hercules Powder Company, Wilmington, Del., a corporation of Delaware No Drawing. Application February 8, 1936, Serial No. 63,029

16 Claims. (Cl. 87—2)

This invention relates to a method for the polymerization of rosin.

Rosin has heretofore been treated with sulfuric acid to remove the color bodies therefrom for the production of a light colored rosin, and to increase the melting point of the rosin by polymerization. Thus, U. S. Patents No. 915,401 and No. 915,402 to Yaryan disclose a process for the refining of rosin, in which a solution of rosin in a petroleum hydrocarbon solvent is treated with sulfuric acid. Such treatment causes the color bodies of the rosin to become insoluble in the petroleum hydrocarbon solvent and be precipitated from the solution of refined rosin. U. S. Patent No. 2,017,866 to Morton discloses a process by which a gasoline solution of rosin is treated with sulfuric acid under limited and specific conditions to polymerize rosin and thereby increase its melting point.

I have discovered that the polymerization of rosin by treatment with sulfuric acid proceeds much more readily in a monocyclic aromatic hydrocarbon solvent than in the petroleum hydrocarbon solvents used by the prior art. The reason for this appears to be the partial solubility of the rosin-polymerized rosin-sulfuric acid association product in the monocyclic aromatic hydrocarbon solvent. Whatever the reason may be, I have discovered that, under exactly the same conditions of reaction, the increase in the melting point of rosin when treated in a monocyclic aromatic hydrocarbon solution may be as much as 20° C. greater than when treated in a petroleum hydrocarbon solution. Furthermore, much milder conditions of reaction and smaller amounts of sulfuric acid can be used to produce a given increase in melting point of rosin, when using a monocyclic aromatic hydrocarbon as a solvent for the rosin, than when using a petroleum hydrocarbon. Furthermore, sulfuric acid of higher strength may be used to treat rosin in solution in monocyclic aromatic hydrocarbons, than has heretofore been used to treat rosin in solution in petroleum hydrocarbons, giving a more rapid increase in the melting point of the rosin per unit of time, and consuming a smaller amount of sulfuric acid. The use of milder conditions of reaction to secure a given increase in melting point is a material commercial advantage in that it produces less depreciation of apparatus and gives economies in the amount of sulfuric acid consumed.

The method in accordance with my invention consists essentially of treating a monocyclic aromatic hydrocarbon solution of rosin with sulfuric acid. After this treatment my process may be completed in either of two ways. The reaction mixture may be agitated with water to remove the sulfuric acid and cause the precipitated polymerized rosin-sulfuric acid association product containing rosin color bodies and some unpolymerized rosin to redissolve, and then the polymerized rosin recovered from its solution by the evaporation of the solvent. In following this procedure the color bodies of the rosin are not separated from the rosin. Alternately, the precipitated polymerized rosin-sulfuric acid association product containing some unpolymerized rosin and the color bodies originally in the rosin and those formed by the polymerization may be separated from the reaction mixture, the reaction mixture treated to remove the sulfuric acid, and then the polymerized rosin recovered from its solution by evaporation of the solvent. In following this alternative procedure, a substantial portion of the color bodies is removed from the rosin, so that a rosin of lighter color is produced than when the color bodies are redissolved.

The rosin treated by the method in accordance with my invention may be any of the various grades of wood or gum rosin. The rosin treated may be heat treated, distilled, or refined by any of the processes known to the art. When treating wood rosin, I prefer to use a wood rosin which has been subjected to a refining operation for the removal of color bodies, although unrefined wood rosin may, if desired, be treated by my process. Thus, for example, a wood rosin having a color grade of I (U. S. standard rosin types) is entirely satisfactory. Any of the usual grades of gum rosin are well adapted for treatment by my process.

More particularly, the method in accordance with this invention involves the treatment of rosin as, for example, the various grades of wood rosin, gum rosin, heat treated rosin, distilled rosin, etc., in solution in a monocyclic aromatic hydrocarbon solvent, such as, for example, benzol, alkylated benzol, toluol, xylol, etc., with sulfuric acid of a concentration within the range of about 65% to about 102% by weight, and preferably within the range of about 85% to about 100% by weight; and in amount within the range of about 0.1% to about 100% by weight, and preferably within the range of about 5% to about 50% by weight on the basis of the rosin contained, with vigorous agitation; at a temperature within the range of −10° C. to about 65° C. and preferably within the range of about 10° C. to about 50° C., and for a period of time from the time required to add the sulfuric acid to the rosin solution of about eight hours or more.

In following the embodiment of my invention in which the color bodies are allowed to remain in the rosin, after the sulfuric acid has reacted with the solution of rosin for the desired period of time, the reaction mixture is washed with hot or cold water, or aqueous solutions of salts, or dilute aqueous solutions of alkali, to remove the sulfuric acid and cause the precipitated color bodies to go back into solution. The amount of water or aqueous solution used to wash the reaction mixture may vary from a weight equal to the weight of sulfuric acid present to ten times that amount or more. The use of an aqueous solution of electrolyte is desirable when the solution of rosin shows a tendency to emulsify in the wash water. Inorganic salts, such as, for example, alkali chlorides, sulfates, borates, phosphates, acetates, alkaline earth halides, aluminum halides, etc., may be added to the wash water in concentrations varying from very dilute to saturated, and the wash water may be at any temperature within the range of 0° C. to 100° C. In general it will be found that concentrations of salt within the range of about 0.5% to about 10% by weight of the water are satisfactory. Dilute solutions of alkalis, such as, sodium hydroxide, ammonium hydroxide, ammonium carbonate, sodium carbonate, etc., and organic bases, such as triethanolamine, etc., are very efficient in removing sulfuric acid from the rosin solution, but care is necessary in their use to avoid reaction with the rosin. The concentration of alkali may vary from about 0.1% to about 10% by weight. Ammonium hydroxide or ammonium carbonate is preferable for the purpose, since any ammonium salt of the rosin which may be formed can easily be decomposed by heat. After the reaction mixture has been washed to decompose the sludge and put back into solution, the polymerized rosin is recovered from its solution by the evaporation of the solvent.

In following the alternate embodiment of my invention in which the precipitated polymerized rosin-sulfuric acid association product containing the rosin color bodies is partially removed from the rosin after the sulfuric acid has reacted with the solution of rosin for the desired period of time, the precipitate which has formed may be conveniently removed from the reaction mixture by centrifuging, or by allowing it to settle and then separating it from the reaction mixture by decantation. The time required for the precipitated sludge to settle depends upon a number of factors, such as, for example, the size of the charge, the viscosity of the rosin solution, etc., and may vary from several minutes to several hours. The separation by centrifuging will be much more rapid. Following the removal of the precipitated sludge, the reaction mixture may be treated in either of two ways. The reaction mixture may, if desired, be washed with hot or cold water, or hot or cold solutions of salts, such as, for example, alkali salts of chlorides, sulfates, phosphates, borates, etc., or dilute alkali solutions, to remove the sulfuric acid. The conditions for washing will be the same as those described hereinbefore for washing the reaction mixture to decompose the precipitated sludge. After the polymerized rosin solution is washed free of sulfuric acid, the polymerized rosin will be recovered by evaporating the solvent. Alternately, the reaction mixture after the decantation of the precipitate may be treated with an absorbent such as activated carbon, fuller's earth, fibrous asbestos, etc. in order to remove the last traces of the color bodies. The amount of absorbent used may vary widely and will depend upon the difficulty and the degree of refinement desired, and on the method of operation used. The absorbent material may be contacted with the rosin solution by agitation of the absorbent in the rosin solution or by running the rosin solution through a bed of the absorbent material. After treatment of the reaction mixture with the absorbent material, and the complete removal of the absorbent material therefrom, as by filtration or centrifuging, the reaction mixture is washed to free it from sulfuric acid as described hereinbefore, and polymerized rosin recovered from the remaining solution by evaporation of the aromatic hydrocarbon.

In following the alternative embodiment of my invention in which the precipitate containing the polymerized rosin-sulfuric acid association product, color bodies originally in the rosin and color bodies produced by the polymerization reaction, is separated from the monocyclic aromatic hydrocarbon solution of rosin following the sulfuric acid treatment, a dark colored polymerized rosin can be recovered from the precipitate by extracting the separated precipitate in a suitable water-immiscible solvent therefor, washing the solution free of sulfuric acid with water, aqueous salt solutions or dilute aqueous alkali solutions, and then recovering a dark colored polymerized rosin from this solution by evaporating the solvent. Suitable solvents for the precipitate are halogenated hydrocarbons, such as, for example, ethylene dichloride, carbon tetrachloride, chlorobenzene, etc.; ethers, such as, for example, diethyl ether, isopropyl ether, dichloro ethyl ether; aromatic hydrocarbons, such as, for example, benzol, toluol, xylol, alkylated benzols, etc.

The precipitated material separated from the rosin solution may likewise be treated with a water miscible solvent such as ethyl alcohol and acetone, and the solution treated with water to precipitate a dark colored polymerized and any contained unpolymerized rosin. The precipitate may be separated, washed, dried, and melted to recover a dark color polymerized rosin.

The precipitated material may likewise be treated with a solution of rosin dissolved in a suitable solvent, preferably water-immiscible, such as, for example, benzol, xylol, ethylene dichloride, ether, etc., and the solution then treated to remove sulfuric acid, and the mixture of polymerized and non-polymerized rosin then recovered by the removal of solvent.

A dark colored polymerized rosin may, likewise, be recovered from the precipitate of polymerized rosin association product and color bodies by adding the sludge to an excess of water with cooling and agitation. After the removal of the sulfuric acid the precipitate will dissolve in a monocyclic aromatic hydrocarbon solvent which has been occluded from the rosin solution, to form a viscous solution of dark colored polymerized rosin in the aromatic hydrocarbon. This solution may be washed free of sulfuric acid with water, aqueous salt solution or dilute aqueous alkali solution, or it may be diluted with additional aromatic hydrocarbon, or with any other rosin solvent, and then washed free of sulfuric acid. Due to the difficulty of washing a very viscous rosin solution, the latter course is preferable.

The above described alternative procedures make possible the removal of all the precipitated material or putting all of it back into solution. Intermediate procedures may be followed in which a part of the precipitated material is put back into solution by treatment with a limited amount of water, or by treatment with an excess of water for a limited time. In general, the color of the polymerized rosin will decrease as the amount of precipitated material put back into solution is decreased and, conversely, the increase in the melting point of the rosin becomes greater. The proportion of the precipitated material which is redissolved will depend on the amount of water added, or if an excess of water is added, by the time for which the water is allowed to remain in contact with the sludge. The amount of water can be more accurately controlled than the time of contact.

The concentration of rosin in the monocyclic aromatic hydrocarbon solution of rosin treated with sulfuric acid in this method may vary over a range of about 10% to about 70% by weight and preferably within the range of about 20% to about 40% by weight. Lower concentrations of rosin in the solution favor the production of the lightest colored products, at the expense of the increase secured in the melting point of the rosin. High concentrations favor the production of the greatest increase in the melting point of rosin in the shortest reaction period and with the use of minimum amounts of sulfuric acid. Likewise, high concentrations favor maximum reductions in the unsaturation of the rosin in the shortest reaction time.

The concentration of sulfuric acid used in the treatment of the rosin solution can vary over the range about 65% to about 102% and preferably within the range of about 85% to about 100%. The exact concentration used will be selected on the basis of the desired product and the selection of the other variables of the reaction. I have found that sulfuric acid of a concentration within the range of about 89% to about 97% is convenient to use. The amount of sulfuric acid used in the reaction mixture may be varied over a wide range. Thus, amounts of sulfuric acid used may vary within the range of about 5% to 50% based on the weight of the rosin present. In general, it will be found desirable to use an amount of sulfuric acid within the range of about 15% to about 40% based on the rosin present.

The temperature at which the reaction is conducted may vary from about −10° C. to about 65° C. Below −10° C. the rate of reaction becomes very slow, requiring long reaction periods to produce any appreciable increase in the melting point of the rosin, while above 65° C. the reaction conditions are so severe that the rosin is darkened in color during the reaction, so that the improvement in color secured by the removal of color bodies in the sulfuric acid precipitate is lost. I have found that the optimum temperature range is from about 10° C. to about 30° C.

The length of time the reaction is allowed to continue will depend on the extent to which it is desired to increase the melting point of the rosin, the desired color of the product, and upon the conditions under which the reaction is being run. Thus, to secure any given increase in the melting point of the rosin being treated, the time of reaction will depend largely upon the temperature of the reaction mixture, the concentration of rosin in the rosin solution, and the amount and concentration of sulfuric acid present. The addition of the sulfuric acid usually requires from about ten minutes to about thirty minutes, depending on size and shape of vessel, efficiency of cooling, etc., if an excessive temperature rise is to be avoided. If desired the sulfuric acid may be sprayed into the reaction mixture, thus favoring uniform contact. The reaction may be stopped at that point or allowed to continue 8 hours or more, although I have found that an additional period of time within the range of 1 to 3 hours after the addition of the sulfuric acid is usually sufficient. A reaction period of more than about 3 hours usually results in an undue darkening of the product, and for that reason is desirably avoided.

The efficiency of agitation of the reaction mixture during the sulfuric acid treatment is a factor of paramount importance in obtaining the maximum increase in the melting point of rosin under any given set of conditions. It will be found that the more efficient the agitation, the greater will be the increase in the melting point of the rosin. Under a given set of reaction conditions the efficiency of agitation may make a difference of 5° C., or more, in the melting point of the product. In the examples given hereinafter, the agitation and size of reaction vessel were kept the same throughout, so that the results are comparable.

The properties of rosin treated by the method of this invention will depend upon the properties of the original rosin and the exact conditions of treatment. It will be found that the melting point of rosin will show the greatest increase when treated by the procedure in which the color body sludge is put back into the rosin solution and, hence, no color bodies removed from the rosin. A rosin treated by this procedure will be found to have its melting point, as determined by the drop method, increased from about 12° C. to about 50° C., its unsaturation decreased, its color somewhat darkened, and its acidity either unchanged or somewhat reduced. When rosin is treated by the alternative procedure in which precipitated material is removed from the rosin solution, a somewhat smaller increase is made in the melting point of the rosin, the product is lighter in color, and usually has a higher acid number.

The product of this method consists of a mixture of polymerized rosin, unpolymerized rosin, unsaponifiable matter, and small amounts of rosin oils which may be formed by the action of the sulfuric acid. If desired, the product may be freed from any rosin oils which may have been formed, by reduced pressure distillation, thereby greatly improving the product by removing any tackiness which may be produced by such oils. I have found that a polymerized wood rosin, from which the rosin oils and unpolymerized material have been removed, will have a melting point within the range of 170° to 180° C., and to have a molecular weight, as determined by the Rast method, of approximately twice that of unpolymerized rosin.

It will be appreciated that the melting points given above and those given hereinafter were obtained by the A. S. T. M. method for determining drop melting points, and it should be noted that this method must be followed exactly to obtain accurate and comparable results.

Practical embodiments of the method in accordance with this invention, and the properties of the polymerized rosins produced thereby, are illustrated by the examples which follow.

The procedure in accordance with this invention, in which none of the sulfuric acid-polymerized rosin precipitate is removed from the rosin, is illustrated by the following example.

Example I 82 grams of 95% sulfuric acid were added to approximately 330 grams of I wood rosin dissolved in 500 grams of benzol at a temperature of 12°–15° C. within a period of 0.25 hour. This mixture was then agitated for a period of 1.25 hours, and then 500 cc. of water were added and the mixture agitated for an additional 0.5 hour. The benzol solution of rosin was then separated from the aqueous sulfuric acid and washed with several portions of water until the sulfuric acid was completely removed. The polymerized rosin was then recovered by evaporating the benzol. The properties of this product as compared with those of the original I wood rosin are listed in the following table.

TABLE I

| | I wood rosin | Polymerized rosin |
|---|---|---|
| Melting point (drop method) | 80° C. | 108° C. |
| Acid number | 163 | 160 |
| $(SCN)_2$ value | 85 | 66 |
| Color | I | F+ |

The procedure in accordance with this invention, by which the sulfuric acid-polymerized rosin precipitate with its contained color bodies is removed from the rosin in the polymerization process, is illustrated in a series of examples which follow. This series of examples also shows the variations in the properties of the product which may be produced by altering the conditions of the reaction. In this series, 830 grams of a solution of wood rosin in benzol were treated in each experiment. The concentrations and conditions of reaction were varied as follows: 25% and 35% concentrations of rosin in the benzol were treated; 13%, 25%, and 50% sulfuric acid on the basis of the amount of rosin present were used. A period of 0.25 hour was used in each experiment for the addition of sulfuric acid to the rosin solution, with additional periods of reaction varying from nil to 6 hours; and reaction temperatures of 16° C. and 28° C. were used. At the conclusion of the reaction, in each experiment, the sludge was allowed to settle out of the reaction mixture by allowing it to stand for five minutes. The reaction mixture was then decanted from the sludge, shaken with 6 grams of activated carbon, filtered and washed with four successive 2000 cc. portions of 4–8% solutions of sodium chloride. The benzol was then evaporated under atmospheric pressure, and then under reduced pressure, to recover the polymerized rosin. The sludge separated from the reaction mixture was then extracted with ether to dissolve the precipitated material, the extract washed with water and the ether evaporated to recover a dark colored polymerized rosin. Table II shows the exact concentrations and conditions used in each example, where such were varied from one example to another as indicated hereinbefore; the yields and properties of the light colored polymerized rosin recovered from the benzol solution; and the yield of the dark polymerized rosin recovered from the sludge.

The wood rosin treated in each of the examples of Table II and a color grade of I (standard U. S. rosin types), a melting point of 80° C. as determined by the drop method, an acid number of 163, and a $(SCN)_2$ value of 85. In these examples, the melting point of the pale polymerized rosin produced was from 11° C. to 36° C. higher than that of the starting material, depending upon the conditions of reaction and concentration. The unsaturation, as measured by the $(SCN)_2$ value was materially reduced, and the color grade was either the same, slightly darker or slightly lighter. In reference to the color grade of the product, it will be appreciated that where no color bodies are removed, as in Example I, the rosin is materially darkened by the polymerization, but that by the removal of the color-bodies following the precedure, a polymerized product of the same or even a better color grade than the starting material can be obtained. It will be appreciated that the more absorbent material used to clarify the rosin solution, the lighter will be the color of the rosin obtained therefrom.

TABLE II

Hardening of I Rosin with 95% $H_2SO_4$

Solvent: Benzol
Concentration of Rosin: 35%
Time of Introduction of $H_2SO_4$: ¼ Hr.
(Time in hours represents agitation period following $H_2SO_4$ introduction)

Concentration of rosin 35%.—Pale polymerized rosin

| Example | $H_2SO_4$ percent | Temp. °C. | Time (hrs.) | Percent yield | Acid No. | $(SCN)_2$ value | Melting point (drop) | Color grade | Yield sludge rosin |
|---|---|---|---|---|---|---|---|---|---|
| 2 | 25 | 13–18 | | 81 | 169 | 78 | 95 | M+ | 13 |
| 3 | 25 | 13–18 | 0.5 | 74 | 164 | 66 | 99 | K+ | 19 |
| 4 | 25 | 13–18 | 1.25 | 77 | 163 | 64 | 102 | M | 19 |
| 5 | 25 | 13–18 | 3.0 | 80 | 157 | 55 | 109 | I | 14 |
| 6 | 25 | 13–18 | 6.0 | 81 | 154 | 51 | 109 | H | 14 |
| 7 | 25 | 27–29 | | 78 | 166 | 71 | 94 | I+ | 17 |
| 8 | 25 | 27–29 | 0.5 | 80 | 160 | 58 | 102 | K+ | 16 |
| 9 | 25 | 27–29 | 1.25 | 81 | 156 | 52 | 109 | G | 15 |
| 10 | 25 | 27–29 | 3.0 | 83 | 151 | 50 | 113 | G+ | 13 |
| 11 | 25 | 27–29 | 6.0 | 84 | 150 | 47 | 116 | D+ | 13 |

TABLE II.—Continued

*Concentration of rosin: 25%*

| Example | H₂SO₄ percent | Temp. °C. | Time (hrs.) | Per cent yield | Acid No. | (SCN)₂ value | Melting point (drop) | Color grade | Yield sludge rosin |
|---|---|---|---|---|---|---|---|---|---|
| 12 | 13 | 13-18 | 0.5 | 76 | 168 | 81 | 91 | I | 8 |
| 13 | 13 | 13-18 | 3.0 | 74 | 167 | 76 | 94 | H | 8 |
| 14 | 13 | 13-18 | 6.0 | 76 | 163 | 70 | 99 | G | 6 |
| 15 | 25 | 13-18 |  | 82 | 166 | 72 | 90 | M | 14 |
| 16 | 25 | 13-18 | 1.25 | 81 | 165 | 68 | 98 | M+ | 12 |
| 17 | 25 | 13-18 | 2.0 | 77 | 162 | 61 | 101 | K+ | 15 |
| 18 | 25 | 13-18 | 6.0 | 68 | 151 | 42 | 106 | I | 14 |
| 19 | 50 | 13-18 |  | 65 | 165 | 67 | 90 | N | 28 |
| 20 | 50 | 13-18 | 0.5 | 58 | 155 |  | 94 | M+ | 37 |
| 21 | 50 | 13-18 | 1.25 | 53 | 141 | 26 | 98 | I+ | 33 |
| 22 | 50 | 13-18 | 2.0 | 53 | 136 | 24 | 99 | I | 27 |
| 23 | 13 | 27-29 |  | 75 | 167 |  | 91 | H+ | 6 |
| 24 | 13 | 27-29 | 1.0 | 75 | 165 | 72 | 95 | H+ | 8 |
| 25 | 13 | 27-29 | 3.0 | 77 | 164 | 72 | 100 | G+ | 6 |
| 26 | 13 | 27-29 | 6.0 | 79 | 163 | 66 | 104 |  | 4 |
| 27 | 25 | 27-29 |  | 81 | 165 | 77 | 97 | N | 14 |
| 28 | 25 | 27-29 | 0.5 | 79 | 164 | 65 | 99 | I+ | 16 |
| 29 | 25 | 27-29 | 1.0 | 70 | 157 | 57 | 106 | I | 15 |
| 30 | 25 | 27-29 | 2.0 | 68 | 153 | 49 | 107 | H+ | 13 |
| 31 | 25 | 27-29 | 6.0 | 62 | 140 | 42 | 116 | G+ | 12 |
| 32 | 50 | 27-29 |  | 51 | 152 | 40 | 96 | M+ | 32 |
| 33 | 50 | 27-29 | 0.5 | 55 | 138 | 27 | 101 | H+ | 28 |
| 34 | 50 | 27-29 | 1.5 | 54 | 126 | 23 | 102 | G+ | 27 |
| 35 | 50 | 27-29 | 6.0 | 50 | 115 | 18 | 111 | F+ | 25 |

Further illustration of the procedure in accordance with this invention, by which color bodies are removed from rosin in the polymerization process, is given in the following examples using toluol and xylol as solvents. In these examples, 830 grams of a solution of I wood rosin in toluol and xylol, respectively, having a concentration of 35% rosin by weight were treated with 73 grams of 95% sulfuric acid at 15° C., with vigorous agitation, during a period of 15 minutes. The reaction mixture was then agitated at a temperature of 16°-18° C. for a period of 1.25 hours. The sludge was allowed to settle and the solution decanted from the sludge. In each of the two examples, the rosin solution was divided into equal portions, and one of the two portions washed with a warm 3% sodium chloride solution, until the sulfuric acid was removed. The polymerized rosin was then recovered from this solution by the evaporation of the solvent. The other portion of the reaction mixture, in each example, was shaken with 4 grams of activated carbon, filtered, the solution washed free of sulfuric acid, and the polymerized rosin recovered by evaporating the solvent. The properties of each of the polymerized rosins produced in these examples, in comparison with the properties of the original I wood rosin, are given in Table III. The product of each example identified as (a) in the table was not treated with activated carbon, while the one identified as (b) was so treated.

TABLE III

|  | Solvent | Melting point | Acid number | Color |
|---|---|---|---|---|
|  |  | ° C. |  |  |
| I wood rosin (before treatment) |  | 80 | 164 | I |
| Example 36 (a) | toluol | 99 | 161 | M |
| Example 36 (b) | do | 99 | 161 | M |
| Example 37 (a) | xylol | 94 | 164 | I |
| Example 37 (b) | do | 94 | 164 | M+ |

The following example illustrates the procedure by which a precipitate is removed from rosin in the polymerization process, as applied to a gum rosin. 830 grams of a 35% solution of gum rosin in benzol were treated with 73 grams of 95% sulfuric acid at 15° C., with vigorous agitation during a period of 15 minutes. The reaction mixture was then agitated at a temperature of 16°-18° C. for a period of 1.25 hours. The sludge was allowed to settle and the solution decanted from the sludge. The rosin solution was then divided into two equal parts, and one of the two portions was washed with a warm 3% sodium chloride solution until the sulfuric acid was removed. The polymerized rosin was then recovered from this solution by the evaporation of the solvent. The other portion of the reaction mixture was shaken with four grams of activated carbon, filtered, the solution washed free of sulfuric acid, and the polymerized rosin recovered by evaporating the solvent. The properties of the polymerized rosins so produced are given in Table IV, in which the product identified as (a) was not treated with activated carbon, while the one identified as (b) was so treated.

TABLE IV

|  | Melting point | Acid number | Color |
|---|---|---|---|
|  | ° C. |  |  |
| Gum rosin (before treatment) | 85 | 163 | N |
| Example 38 (a) | 108 | 163 | K |
| Example 38 (b) | 108 | 163 | X |

The following example illustrates procedure in accordance with my invention in which a dark wood rosin is treated to produce a material increase in its melting point and at the same time improve its color. 72 grams of 95% sulfuric acid were added to a solution of 290 grams of FF wood rosin in 540 grams of benzol, during a period of fifteen minutes, at a temperature of 15° C. The mixture was then agitated at a temperature of 15° C.-18° C. for a period of 1.25 hours. The agitation was then stopped, the mixture allowed to stand for about 10 minutes, and the benzol solution of polymerized resin decanted from the sludge. It was then shaken with 9 grams of activated carbon, filtered, washed with dilute sodium chloride solution until substantially neutral, and polymerized rosin recovered by evaporating the benzol. The sludge was then extracted with ether, the extract washed, and the solvent evaporated. The product recovered from the sludge was a dark colored polymerized rosin.

The two products of this procedure had the physical characteristics given in Table V.

TABLE V

|  | FF rosin (starting material) | Benzol product | Ether product (from sludge) |
|---|---|---|---|
| Melting point (drop method) | 78° C. | 106.5° C. | 135° C. |
| Acid number | 156 | 151.5 | 98 |
| Color (U. S. standard rosin types) | FF | H | dark |
| Thiocyanate value | 88 | 60 | |
| Yield | | 78% | 20% |

As shown by the data of this table a marked increase was produced in the melting point of both fractions and the fraction from the benzol solution was substantially improved in color.

As stated hereinbefore, my procedure for the polymerization of rosin by the treatment of a mono-cyclic aromatic hydrocarbon solution of rosin with sulfuric acid is decidedly superior to the prior art processes for the polymerization of rosin, in which a solution of rosin in petroleum hydrocarbons is treated with sulfuric acid, in producing greater increases in the melting point of rosin under the same conditions of reaction. Illustration of the superiority of my procedure is given by two examples in which rosin was treated in gasoline solution under identical conditions used in the above Examples 9 and 15, respectively. The comparison of the properties of the light colored polymerized rosins produced in each of the two solutions is given in Table VI.

TABLE VI

|  | Melting point (drop method) | Acid number | (SCN)$_2$ value | Color | Yield |
|---|---|---|---|---|---|
| Example 9 | °C. | | | | % |
| Benzol | 109 | 156 | 52 | G | 81 |
| Gasoline | 93 | 168 | | M | 77 |
| Example 15 | | | | | |
| Benzol | 90 | 166 | 72 | M | |
| Gasoline | 83 | 169 | 77 | X | |

These comparisons show in the higher melting points, the lower acid numbers, the lower (SCN)$_2$ value and the darker color, that the rosin has in both comparisons, under identical conditions of reaction, undergone more polymerization in the benzol solution than in the gasoline solution.

It will be understood that the details and examples given hereinbefore are illustrative only, and in no way limiting on my invention as broadly described hereinbefore and claimed hereinafter.

What I claim and desire to protect by Letters Patent is:

1. A method for the polymerization of rosin which includes bringing a solution of rosin in a monocyclic aromatic hydrocarbon into intimate contact with sulfuric acid having a concentration within the range of about 65% to about 102% by weight at a temperature within the range of about −10° C. to about 65° C. without substantial sulfonation of the rosin, separating the polymerized rosin solution from the sulfuric acid and recovering polymerized rosin by evaporating the monocyclic aromatic hydrocarbon.

2. A method for the polymerization of rosin which includes bringing a solution of rosin in a monocyclic aromatic hydrocarbon into intimate contact with sulfuric acid having a concentration within the range of about 65% to about 102% by weight at a temperature within the range of about −10° C. to about 65° C. without substantial sulfonation of the rosin, separating the polymerized rosin solution from the sulfuric acid and washing with water, and recovering the polymerized rosin by evaporating the monocyclic aromatic hydrocarbon.

3. A method for the polymerization of rosin which includes bringing a solution of rosin in a monocyclic aromatic hydrocarbon into intimate contact with sulfuric acid having a concentration within the range of about 65% to about 102% by weight at a temperature within the range of about −10° C. to about 65° C. without substantial sulfonation of the rosin, and whereby a sludge containing polymerized rosin-sulfuric acid association products and rosin color-bodies is precipitated, adding water to the reaction mixture to cause the color bodies contained in the sludge to redissolve in the monocyclic aromatic hydrocarbon, separating the sulfuric acid from the polymerized rosin solution and recovering the polymerized rosin by evaporation of the monocyclic aromatic hydrocarbon.

4. A method for the polymerization of rosin which includes bringing a solution of rosin in a monocyclic aromatic hydrocarbon into intimate contact with sulfuric acid having a concentration within the range of about 65% to about 102% by weight at a temperature within the range of about −10° C. to about 65° C. without substantial sulfonation of the rosin, separating the polymerized rosin solution from the sludge formed therein, removing the sulfuric acid from the polymerizede rosin solution and recovering the polymerized rosin by evaporating the monocyclic aromatic hydrocarbon.

5. A method for the polymerization of rosin which includes bringing a solution of rosin in a monocyclic aromatic hydrocarbon into intimate contact with sulfuric acid having a concentration within the range of about 65% to about 102% by weight at a temperature within the range of about −10° C. to about 65° C. without substantial sulfonation of the rosin, separating the rosin solution from the sludge formed therein, washing the polymerized rosin solution free of sulfuric acid, recovering polymerized rosin therefrom by evaporating the monocyclic aromatic hydrocarbon, dissolving the sludge in a solvent therefor, washing the sludge solution free of sulfuric acid and recovering a dark colored polymerized rosin therefrom by evaporating the solvent.

6. A method for the polymerization of rosin which includes bringing a solution of rosin in a monocyclic aromatic hydrocarbon into intimate contact with sulfuric acid having a concentration within the range of about 65% to about 102% by weight at a temperature within the range of about −10° C. to about 65° C. without substantial sulfonation of the rosin, and whereby a sludge containing polymerized rosin-sulfuric acid association products and rosin color-bodies is precipitated, adding water to the reaction mixture in amount sufficient to cause the color bodies contained in part of the sludge to redissolve in the polymerized rosin solution, separating the rosin solution from the remaining sludge, washing the polymerized rosin solution free of sulfuric acid, and recovering polymerized rosin therefrom by evaporating the solvent.

7. A method for the polymerization of rosin which includes bringing a solution of rosin in benzene into intimate contact with sulfuric acid having a concentration within the range of about 65% to about 102% by weight at a temperature within the range of about −10° C. to about 65° C. without substantial sulfonation of the rosin, separating the polymerized rosin solution from the sulfuric acid and recovering polymerized rosin by evaporating the benzene.

8. A method for the polymerization of rosin which includes bringing a solution of rosin in benzene into intimate contact with sulfuric acid having a concentration within the range of about 65% to about 102% by weight at a temperature within the range of about −10° C. to about 65° C. without substantial sulfonation of the rosin, separating the polymerized rosin solution from the sulfuric acid and washing with water, and recovering the polymerized rosin by evaporating the benzene.

9. A method for the polymerization of rosin which includes bringing a solution of rosin in benzene into intimate contact with sulfuric acid having a concentration within the range of about 65% to about 102% by weight at a temperature within the range of about −10° C. to about 65° C. without substantial sulfonation of the rosin, and whereby a sludge containing polymerized rosin-sulfuric acid association products and color bodies is precipitated, adding water to the reaction mixture to cause the color bodies contained in the sludge to redissolve in the benzene, separating the sulfuric acid from the polymerized rosin solution and recovering the polymerized rosin by evaporation of the benzene.

10. A method for the polymerization of rosin which includes bringing a solution of rosin in benzene into intimate contact with sulfuric acid having a concentration within the range of about 65% to about 102% by weight at a temperature within the range of about −10° C. to about 65° C. without substantial sulfonation of the rosin, separating the polymerized rosin solution from the sludge formed therein, removing the sulfuric acid from the polymerized rosin solution and recovering the polymerized rosin by evaporating the benzene.

11. A method for the polymerization of rosin which includes bringing a solution of rosin in benzene into intimate contact with sulfuric acid having a concentration within the range of about 65% to about 102% by weight at a temperature within the range of about −10° C. to about 65° C. without substantial sulfonation of the rosin, separating the rosin solution from the sludge formed therein, washing the polymerized rosin solution free of sulfuric acid, recovering polymerized rosin therefrom by evaporating the benzene, dissolving the sludge in a solvent therefor, washing the sludge solution free of sulfuric acid and recovering a dark colored polymerized rosin therefrom by evaporating the solvent.

12. A method for the polymerization of rosin which includes bringing a solution of rosin in benzene into intimate contact with sulfuric acid having a concentration within the range of about 65% to about 102% by weight at a temperature within the range of about −10° C. to about 65° C. without substantial sulfonation of the rosin, and whereby a sludge containing polymerized rosin-sulfuric acid association products and color-bodies is precipitated, adding water to the reaction mixture in amount sufficient to cause the color bodies contained in a part of the sludge to redissolve in the polymerized rosin solution, separating the rosin solution from the remaining sludge, washing the polymerized rosin solution free of sulfuric acid, and recovering polymerized rosin therefrom by evaporating the solvent.

13. A method for the polymerization of rosin which includes bringing a solution of rosin in benzene into intimate contact with sulfuric acid having a concentration within the range of about 89% to about 97% by weight at a temperature within the range of about 10° C. to about 30° C. without substantial sulfonation of the rosin, separating the polymerized rosin solution from the sulfuric acid and recovering polymerized rosin by evaporating the benzene.

14. A method for the polymerization of rosin which includes bringing a solution of rosin in a monocyclic aromatic hydrocarbon into intimate contact with sulfuric acid having a concentration within the range of about 89% to about 97% by weight at a temperature within the range of about 10° C. to about 30° C. without substantial sulfonation of the rosin, separating the polymerized rosin solution from the sulfuric acid and recovering polymerized rosin by evaporating the monocyclic aromatic hydrocarbon.

15. A method for the polymerization of rosin which includes bringing a solution of rosin in a monocyclic aromatic hydrocarbon into intimate contact with sulfuric acid having a concentration within the range of about 89% to about 97% by weight at a temperature within the range of about 10° C. to about 30° C. without substantial sulfonation thereof, and whereby a sludge containing polymerized rosin-sulfuric acid association products and color-bodies is precipitated, adding water to the reaction mixture to cause the color-bodies to redissolve in the monocyclic aromatic hydrocarbon, separating sulfuric acid from the polymerized rosin solution and recovering the polymerized rosin by evaporation of the monocyclic aromatic hydrocarbon.

16. A method for the polymerization of rosin which includes bringing a solution of rosin in a monocyclic aromatic hydrocarbon into intimate contact with sulfuric acid having a concentration within the range of about 89% to about 97% by weight at a temperature within the range of about 10° C. to about 30° C. without substantial sulfonation thereof, separating the polymerized rosin solution from the sludge formed therein, removing the sulfuric acid from the polymerized rosin solution and recovering the polymerized rosin by evaporating the monocyclic aromatic hydrocarbon.

ALFRED L. RUMMELSBURG.

CERTIFICATE OF CORRECTION.

Patent No. 2,108,928. February 22, 1938.

ALFRED L. RUMMELSBURG.

It is hereby certified that error appears in the printed specification of the above numbered patent requiring correction as follows: Page 2, first column, line 41, after "put" insert the words the color-bodies contained therein; page 6, second column, line 34-35, claim 4, for "polymerizede" read polymerized; and that the said Letters Patent should be read with these corrections therein that the same may conform to the record of the case in the Patent Office.

Signed and sealed this 5th day of April, A. D. 1938.

(Seal)

Henry Van Arsdale,
Acting Commissioner of Patents.